Oct. 30, 1956        J. G. PHIPPS        2,768,712
AIR BRAKE SAFETY MECHANISM
Filed Feb. 8, 1954        2 Sheets-Sheet 1
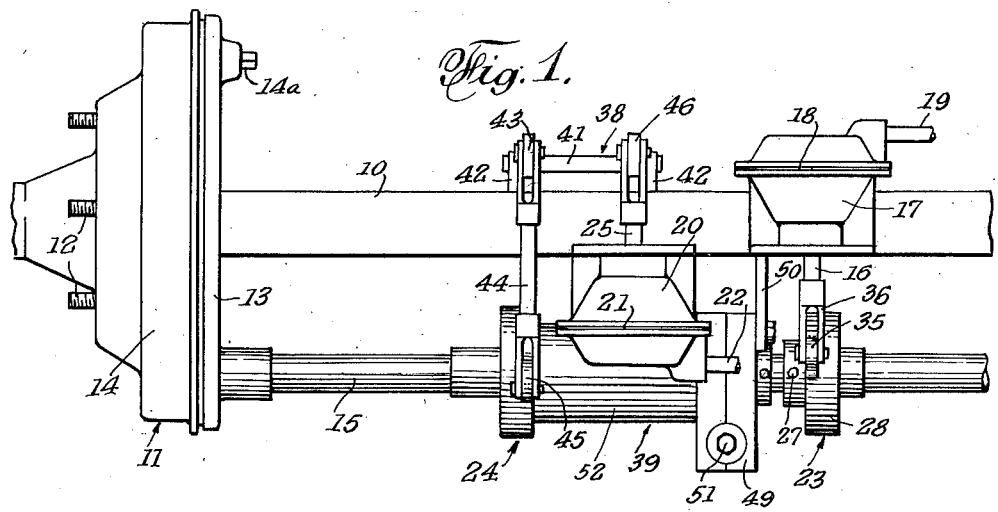
Inventor
JOHN G. PHIPPS
By C. G. Stratton
Attorney Oct. 30, 1956   J. G. PHIPPS   2,768,712
AIR BRAKE SAFETY MECHANISM
Filed Feb. 8, 1954   2 Sheets-Sheet 2
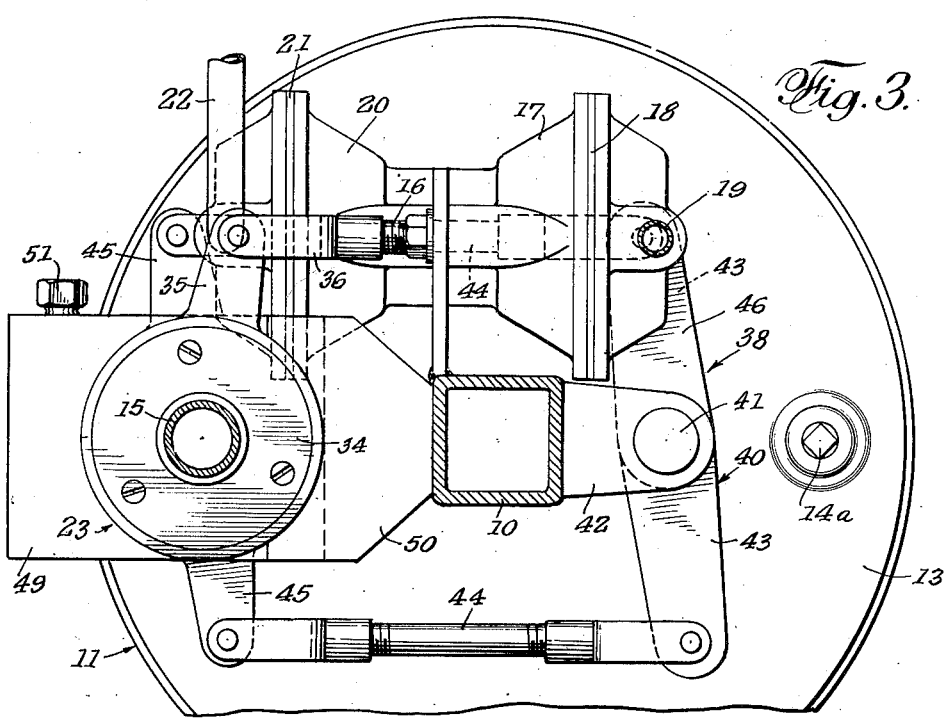
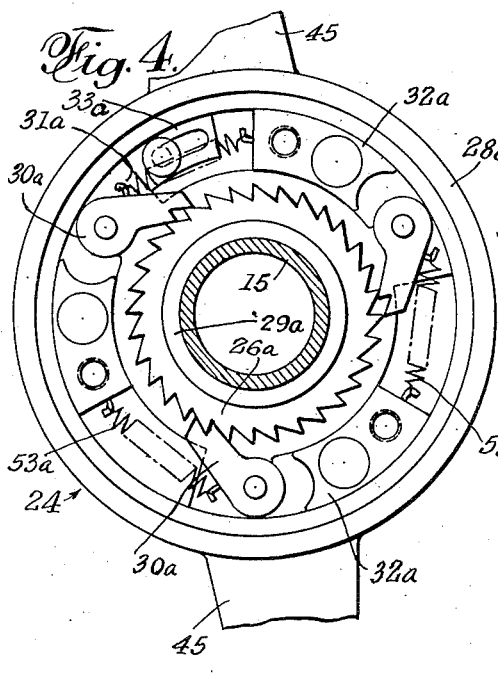
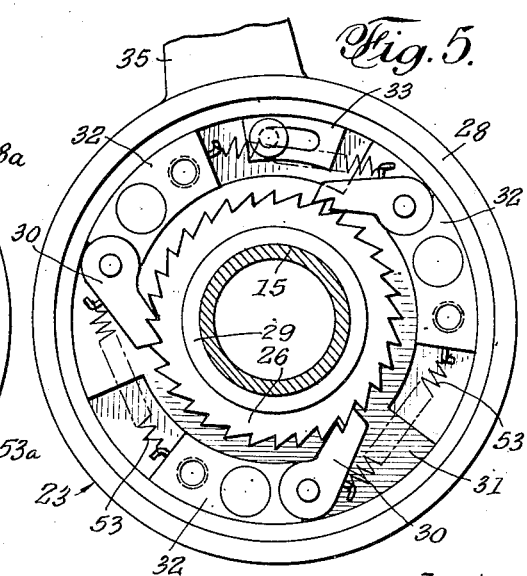
Inventor
JOHN G. PHIPPS
By
C. E. Stratton
Attorney United States Patent Office 2,768,712
Patented Oct. 30, 1956

2,768,712

AIR BRAKE SAFETY MECHANISM

John G. Phipps, Norwalk, Calif.

Application February 8, 1954, Serial No. 408,699

7 Claims. (Cl. 188—106)

This invention relates to braking mechanism that has general use in vehicles and is more particularly adapted for use on trailers.

An object of the present invention is to provide means to operate air-operated brakes either under emergency conditions, as when the air line is broken or leaks, or, when desired, as a parking brake. Thus, the invention is characterized by safety and provides against accidental release of a vehicle, for instance a trailer, as may result from a leak in the air line. Also, by purposely bleeding the air line, such emergency brakes may be employed as parking brakes.

Wheel brakes conventionally comprise a pair of brake shoes hinged together at one end, spring biased to be retracted out of engagement with a brake drum, and spread into drum engagement by the lugs of a cam rotated by a shaft. After initial installation and setting of the brake shoes with proper released clearance, the only adjustment necessary results from brake shoe wear and is usually accomplished by rotation of said shaft, or in other ways, to cause the cam to follow up the brake shoes until wear is compensated for. In air brakes, when substantially all of the stroke of the chambered unit is used up before brake application is had, such adjustment becomes necessary.

Another object of the invention is to provide in a braking mechanism as above indicated, means to automatically adjust or take up the braking adjustment.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a plan view of braking mechanism according to the invention and shown applied to a vehicle brake.

Fig. 2 is an enlarged longitudinal sectional view of a portion of said mechanism.

Fig. 3 is a similarly enlarged end view as seen from the right of Fig. 1.

Figs. 4 and 5 are further enlarged detail views as taken on the respective lines 4—4 and 5—5 of Fig. 2.

In the drawings, the fixed axle 10 of a vehicle is shown with one of the brake assemblies 11 usually provided at each end and to which the vehicle wheels are removably attached as by studs 12. The assembly 11 is quite conventional and, therefore, forms no part of this invention. The same usually comprises a part 13 that is affixed to axle 10, a revoluble drum 14 that is affixed to the vehicle wheel, and the conventional brake shoes that are pivoted as at 14a, are expanded into frictional engagement with said drum by a cam on the end of a shaft 15, and contracted by spring means that draw said shoes together out of drum engagement.

In a conventional air-operated braking system, the crank arm 16 of a pneumatic chambered unit 17 is actuated by introducing compressed air into chamber 17 which deforms a diaphragm 18 of said unit. Said air is supplied by a conduit 19 and said crank arm 16 is connected to shaft 15 to rock the same in a direction to cause the cams on the end thereof to spread the brake shoes into braking engagement with drums 14. A return spring in unit 17 retracts the crank arm 16 to release the brakes when the air pressure in conduit 19 is released or otherwise dissipated. It will be evident that such air dissipation may be accidental, in which case the brakes would release accidentally. The present novel means utilizes such dissipation of air pressure to operate the brakes 11 and set them to insure stoppage of the vehicle.

The present braking mechanism comprises an auxiliary or emergency pneumatic chambered unit 20 that is similar to unit 17 and, like the latter unit, is held fixed on axle 10 or on any other suitable part of the vehicle. A diaphragm 21 of unit 20 is actuated by compressed air supplied through a conduit 22 which is connected to the same source that supplies conduit 19.

Said mechanism further includes ratchet means 23, mounted on shaft 15, and responsive to projection and retraction of the crank arm 16 of unit 17 to set and release brakes 11, and ratchet means 24, also mounted on shaft 15, and responsive to retraction of crank arm 25 of unit 20 to set brakes 11 upon failure of the air supply to conduits 19 and 22.

The ratchet means 23, shown in Fig. 5, comprises a ratchet wheel 26 affixed to shaft 15 by a set screw or a key 27, a housing 28 mounted to rotate on a hub 29 of said ratchet wheel, a set of pawls 30 spring urged to engage the teeth of the ratchet wheel and mounted on a plate 31 within housing 28 and also mounted to rotate on hub 29, blocks 32 fixedly carried by housing 28 and operatively associated with each pawl 30, and a stop block 33 adjustably carried by said housing 28.

The ratchet means 24, shown in Fig. 4, is substantially similar to means 23 and comparable parts of the former are numbered like those of the latter with the letter "a" added.

A cover plate 34 encloses the parts within housing 28. The housing is provided with a radially extending arm 35 which is connected to the crank arm 16 of unit 17 by means of a fork 36. Figs. 3 and 4 show the means 23 and the means 24 in brake-released position and Fig. 5 shows means 23 in the position in which the brakes are set.

As seen in Fig. 3, crank arm 16 is retracted, being retained in said retracted position by the mentioned return spring within unit 17 because of lack of air pressure in conduit 19. When the brakes are to be set, air is supplied to conduit 19 and the air pressure acting on diaphragm 18, projects crank arm 16 and rocks housing 28 counterclockwise from the position of Fig. 3 to that of Fig. 5. During such rocking movement of the housing, blocks 32 and 33 move counterclockwise as they are carried by said housing. Since the blocks 32 abut the pivoted ends of pawls 30, the latter are also moved counterclockwise, and their engagement with ratchet wheel 26 causes wheel 26 to move in the same direction. Since shaft 15 is fixedly connected to ratchet wheel 26, shaft 15 will be similarly driven to rock the brake shoe cams thereon to brake-setting position. This position is maintained so long as air pressure is maintained in conduit 19. Upon release of air pressure, the parts will return to their initial position with the shaft 15 also returning to its initial position to retract the cams from the brake-shoe-spreading position.

The above brake-setting rotation imparted to shaft 15, rotates ratchet wheel 26a of means 24 in the same direction, which is counter-clockwise, but which is clockwise as seen in Fig. 4 because viewed from the opposite direction as compared to the direction in which Fig. 5 is viewed. Because housing 28a is maintained stationary under normal conditions of operation by means later described, the springs 53a become extended or stretched, and pull on pawls 30a. This, in turn, exerts a rotating action on plate 31a in a clockwise direction also. Thus, the pawls rotate with ratchet wheel 26a.

From the above, it will be seen that there is no relative movement between the pawls and ratchet wheels of both means 23 and means 24 during normal setting and release of the brakes under control of pneumatic unit 17.

By providing three equally spaced pawls 30 and 30a and an even number of ratchet teeth, one pawl is always in driving engagement with the ratchet wheel of each means 23 and 24 under all conditions of adjustment.

The ratchet means 24 is controlled under normal conditions of operation by linkage 38 interconnecting the crankarm 25 of unit 20 with the housing 28a, and under emergency conditions by torsion spring means 39, as shown in Figs. 1 and 2.

The ratchet wheel 26a of means 24 is provided with an elongated sleeve 29a affixed to shaft 15 by a set screw or a key 27a.

The linkage 38, see Fig. 3, comprises a lever 40 pivoted on a shaft 41 mounted between brackets 42 affixed to axle 10. The lever 40 has a pair of similar oppositely extending arms 43 that, are connected to oppositely and radially extending arms 45 of housing 28a by means of links 44. An arm 46, fixed on shaft 41 with lever 40 is connected to crankarm 25 of unit 20.

The conduit 22 leading to unit 20 is always supplied with air pressure which acts on diaphragm 21 to project crank arm 25. Thus, through linkage 38, means 24 is held in brake-release position that is exactly similar to the brake-release position of means 23, as shown in Fig. 4. This position is maintained under normal conditions and allows the teeth of ratchet wheel 26a to slip past pawls 30a as means 23 is operated to set the brakes. When the air pressure in conduit 22 is reduced, as by a leak or break in the line or by bleeding a valve in said line, the spring means 39 will set the brakes by causing pawls 30a to drive ratchet wheel 26a in the same manner that pawls 30 drive ratchet wheel 26 when air is supplied to unit 17.

Said spring means 39 comprises a torsion spring 47 that has one end anchored to housing 28a and the other end to a worm wheel 48 freely rotatable relative to sleeve 29a. Said worm wheel is enclosed in a housing 49 fixedly held at by being secured by a plate 50 to axle 10 and may be rotationally adjusted by a worm 51 to, thereby, adjust the torque of spring 47. A sleeve 52 between housing 28a and housing 49 encloses spring 47.

Air pressure in conduit 22 normally counteracts the force of spring 47 to hold means 24 in brake-release position. Dissipation of said air pressure allows the force of the spring to become effective to set the brakes, either under emergency conditions when air pressure is lost, or by purposely bleeding the line supplying conduit 22.

The stops 33 and 33a are set to allow pawls 30 and 30a to follow their respective ratchet wheels 26 and 26a for a certain distance, thereby imposing a limit of rotation on plates 31 and 31a. Therefore, when the brake shoes become so worn as to allow an inordinately great increment of rotation of shaft 15 when the brakes are being applied by unit 17, ratchet wheel 26 will move beyond the ability of pawls 30 to follow, and one of said pawls will drop into the next tooth of said ratchet wheel to automatically keep the slack properly adjusted. The same occurs also when means 24 is operated and ratchet wheel 26a moves beyond the ability of pawls 30a to follow.

While I have illustrated and described what I now contemplate to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what I claim and desire to be secured by Letters Patent is:

1. In an air-brake mechanism having a pneumatic unit adapted to move a brake-controlling shaft to brake-setting position when air pressure is supplied to the unit, the improvement that comprises a spring-biased ratchet means to move said shaft to brake-setting position, and a second pneumatic unit connected to said ratchet means to prevent said means from moving said shaft when air pressure is supplied to said second unit.

2. In an air-brake mechanism having a pneumatic unit adapted to move a brake-controlling shaft to brake-setting position when air pressure is supplied to the unit, the improvement that comprises a torsion spring-biased ratchet means to move said shaft to brake-setting position, means to adjust the torque of the torsion spring means, and a second pneumatic unit connected to said ratchet means to prevent said means from moving said shaft member when air pressure is supplied to said second unit.

3. Brake mechanism comprising a brake-shoe-operating shaft, a ratchet wheel affixed to said shaft and having a hub, a housing rotationally mounted on the ratchet wheel hub, a set of spring-urged pawls engaging the teeth of said ratchet wheel, a plate within said housing and mounting said pawls, said plate being rotationally mounted on said hub, blocks fixedly carried by the housing and operatively engaged with each said pawl, a stop block adjustably carried by the housing in operative engagement with the pawl-mounting plate, and pneumatic means to rotate the housing and, through the blocks, pawls and ratchet wheel therein, to move said shaft to brake-setting position.

4. Brake mechanism comprising a brake-shoe-operating shaft, a ratchet wheel affixed to said shaft and having a hub, a housing rotationally mounted on the ratchet wheel hub, a set of spring-urged pawls engaging the teeth of said ratchet wheel, a plate within said housing and mounting said pawls, said plate being rotationally mounted on said hub, blocks fixedly carried by the housing and operatively engaged with each said pawl, a stop block adjustably carried by the housing in operative engagement with the pawl-mounting plate, pneumatic means to hold said housing immovable, and spring means biasing said housing to move upon release of the pneumatic means.

5. An air brake safety mechanism comprising a brake-shoe-operating shaft, a pneumatic unit adapted to move said shaft between brake-setting and brake-releasing positions, ratchet means connected to said shaft, a second pneumatic unit continuously supplied with air pressure, linkage means interconnecting said ratchet means and said second pneumatic unit to hold said means in brake-release position, torsion spring means encircling said shaft and connected to said ratchet means and biased to move said means to brake setting position upon depletion of air pressure, and means to adjust the torque of said torsion spring means.

6. An air brake safety mechanism comprising means to operate the brake-controlling member of a vehicle brake, a pneumatic unit to move said means between brake-setting and brake-releasing positions, ratchet means adapted to operate said brake-controlling member, a second pneumatic unit continuously supplied with air pressure to hold said ratchet means in brake-release position, and spring means connected to said ratchet means and biased to move said means to brake-setting position upon depletion of air pressure.

7. An air brake safety mechanism comprising means to operate the brake-controlling member of a vehicle brake, a pneumatic unit to move said means between brake-setting and brake-releasing positions, ratchet means adapted to operate said brake-controlling member, a second pneumatic unit continuously supplied with air pressure, said unit having a crank arm normally projected by said air pressure, linkage means interconnecting said crank arm and said ratchet means to hold said means in brake-release position, and spring means connected to said ratchet means and biased to move said means to brake-setting position upon depletion of air pressure.

References Cited in the file of this patent

UNITED STATES PATENTS

| | | |
|---|---|---|
| 363,310 | Wilson | May 17, 1887 |
| 2,409,908 | Simpkins | Oct. 22, 1946 |
| 2,569,479 | Lonngren | Oct. 2, 1951 |
| 2,642,960 | Wilson | June 23, 1953 |